(12) United States Patent
Jia et al.

(10) Patent No.: US 12,461,282 B2
(45) Date of Patent: Nov. 4, 2025

(54) DISPLAY MODULE AND DISPLAY DEVICE (71) Applicant: WUHAN CHINA STAR OPTOELECTRONICS SEMICONDUCTOR DISPLAY TECHNOLOGY CO., LTD., Hubei (CN)

(72) Inventors: Yongzhen Jia, Hubei (CN); Kuihua You, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/756,649

(22) PCT Filed: May 16, 2022

(86) PCT No.: PCT/CN2022/092976
§ 371 (c)(1),
(2) Date: May 29, 2022

(87) PCT Pub. No.: WO2023/201800
PCT Pub. Date: Oct. 26, 2023

(65) Prior Publication Data
US 2024/0159939 A1 May 16, 2024

(30) Foreign Application Priority Data
Apr. 20, 2022 (CN) .......................... 202210419013.7

(51) Int. Cl.
*G02B 1/111* (2015.01)
*H04M 1/02* (2006.01)

(52) U.S. Cl.
CPC ............ *G02B 1/111* (2013.01); *H04M 1/0264* (2013.01)

(58) Field of Classification Search
CPC ........ G02B 1/111; G02B 1/11; H04M 1/0264; H04M 1/0266; G09F 9/30
See application file for complete search history.

(56) References Cited

U.S. PATENT DOCUMENTS

2014/0162043 A1\* 6/2014 Schmid .................. B32B 17/06
428/432
2020/0064541 A1 2/2020 Jeon
(Continued)

FOREIGN PATENT DOCUMENTS

| CN | 103728680 A | 4/2014 |
|---|---|---|
| CN | 104678466 A | 6/2015 |

(Continued)

OTHER PUBLICATIONS

International Search Report in International application No. PCT/CN2022/092976, mailed on Dec. 21, 2022.
(Continued)

*Primary Examiner* — Twyler L Haskins
*Assistant Examiner* — John H Morehead, III
(74) *Attorney, Agent, or Firm* — PV IP PC; Wei Te Chung (57) ABSTRACT

The display module and the display device provided by the embodiments of the present disclosure include a display panel and a supporting layer, the display module includes a light-enhancing layer, the light-enhancing layer is arranged in a through hole, and an anti-reflection layer is disposed on at least one light-transmitting surface of the light-enhancing layer. Under action of the light-enhancing layer and the anti-reflection layer, the light will make the display effect in the display area and the camera area be consistent, thereby (Continued)

reducing the chromatic aberration between different areas of the display panel and improving the display effect.

20 Claims, 5 Drawing Sheets

(56) References Cited

U.S. PATENT DOCUMENTS

| | | | |
|---|---|---|---|
| 2020/0117034 A1* | 4/2020 | Yin | G06F 1/1605 |
| 2020/0319682 A1* | 10/2020 | Moon | G06F 1/1637 |
| 2021/0149157 A1* | 5/2021 | Kim | H04N 23/57 |
| 2021/0151425 A1* | 5/2021 | Kim | H10K 59/131 |
| 2021/0351236 A1* | 11/2021 | Shin | H10K 59/873 |
| 2021/0360194 A1* | 11/2021 | Zhao | H10K 59/131 |
| 2021/0408173 A1* | 12/2021 | Zhang | H10K 77/111 |
| 2022/0124913 A1* | 4/2022 | Kwak | G09F 9/30 |
| 2022/0141363 A1* | 5/2022 | Tong | H10K 77/10 |
| | | | 348/333.08 |
| 2022/0197339 A1* | 6/2022 | Bao | H04N 23/57 |
| 2022/0208897 A1* | 6/2022 | Yue | H04N 23/55 |
| 2022/0217226 A1* | 7/2022 | Jing | H04M 1/0264 |
| 2022/0329278 A1* | 10/2022 | Yoon | H01Q 21/28 |

FOREIGN PATENT DOCUMENTS

| | | |
|---|---|---|
| CN | 109068044 A | 12/2018 |
| CN | 111725274 A | 9/2020 |
| CN | 211480033 U | 9/2020 |
| WO | 2021167373 A1 | 8/2021 |

OTHER PUBLICATIONS

Written Opinion of the International Search Authority in International application No. PCT/CN2022/092976, mailed on Dec. 21, 2022.

Chinese Office Action issued in corresponding Chinese Patent Application No. 202210419013.7 dated Nov. 4, 2022, pp. 1-6.

* cited by examiner

DISPLAY MODULE AND DISPLAY DEVICE

FIELD OF INVENTION

The present disclosure relates to a technical field of display and manufacture of display devices, and particularly to a display module and a display device.

BACKGROUND OF INVENTION

With a development of display technologies such as a manufacturing process of display panels, people have put forward higher requirements for performance and quality of display panels and devices.

In order to further improve functions of the display panel, the display panel is gradually developing towards a narrow frame and a full screen. Because a display area of a full-screen display panel is larger and a frame of the full-screen display panel is also narrower, user experiences can be greatly improved. The full-screen display panel is favored. However, in the prior art, the display panel also needs to have other performances, such as a camera function. When preparing the full-screen display panel, an under-screen camera (camera under panel, CUP) technology is usually used for manufacturing. In the CUP technology, a hole structure is defined under a screen, and a camera module is arranged in the corresponding hole structure, so as to protect an integrity of a plane surface of the screen and to realize the camera function of the display panel at a same time. Compared with a traditional hole-digging technology, the display panel manufactured by the CUP technology can solve at least one problem of black holes in the camera area to a greater extent and make a difference between the display area and the camera area on the full screen be further reduced. However, when the full-screen display panel is in an off-screen state, since a brightness of the display area is reduced at this time, and light transmissions in different areas are different, such as diffraction phenomenon, chromatic aberration between different areas is obvious. When users observe the display panel, the camera area in the full-screen display can be easily observed visually, which reduces a display effect of the full-screen display panel and is not conducive to improving overall performances of the display panel.

Therefore, it is necessary to propose solutions to problems in the prior art.

SUMMARY OF INVENTION

Technical Problem

In summary, for a display panel prepared by the prior art, when the display panel is in different states, such as when the display panel is in a non-display state such as an off-screen state, a difference between a non-display area and a display area of the screen is larger, it is easy to visually observe openings provided in the camera area, thereby reducing user experience, and is not conducive to further improve the performances of the display panel.

Technical Solutions

In order to solve the above problems, embodiments of the present disclosure provide a display module and a display device, so as to improve a chromatic aberration between the display area and the camera area in the full-screen display panel, thereby effectively improving display effects and overall performances of the display module and the display device.

In order to solve the above problems, the present disclosure provide a display module,
including a display area and a camera area disposed on at least one side of the display area, the display module including:
a display panel; and
a supporting layer, the supporting layer being disposed on one side of the display panel away from a light output side of the display panel, the supporting layer having a through hole, and the through hole is correspondingly disposed in the camera area;
wherein, the display module further includes a light-enhancing layer, the light-enhancing layer is disposed in the through hole, and an anti-reflection layer is disposed on at least one light-transmitting surface of the light-enhancing layer, and the light-enhancing layer is symmetrical with respect to a central axis of the through hole.

In a second aspect, the embodiments of the present disclosure further provide a display module, the display module includes:
a display panel; and
a supporting layer, the supporting layer being disposed on one side of the display panel away from a light output side of the display panel, the supporting layer having a through hole, and the through hole is correspondingly disposed in the camera area;
wherein, the display module further comprises a light-enhancing layer, the light-enhancing layer is disposed in the through hole, and an anti-reflection layer is disposed on at least one light-transmitting surface of the light-enhancing layer.

According to an embodiment of the present disclosure, the anti-reflection layer is patterned and disposed on the light-enhancing layer.

According to an embodiment of the present disclosure, the anti-reflection layer comprises a plurality of anti-reflection strips arranged at intervals.

According to an embodiment of the present disclosure, the plurality of the anti-reflection strips are set in serpentine patterns along a same direction.

According to an embodiment of the present disclosure, a spacing between two adjacent of the anti-reflection strips in the serpentine pattern is greater than 0.1 mm and less than 1 mm.

According to an embodiment of the present disclosure, intervals between adjacent of the serpentine patterns are different.

According to an embodiment of the present disclosure, the plurality of the anti-reflection strips are arranged to be concentric circle structures on the light-enhancing layer.

According to an embodiment of the present disclosure, a width of one of the anti-reflection strips arranged at an edge area of the concentric circle structure is greater than a width of any one of the anti-reflection strips arranged at a central area of the concentric circle structure.

According to an embodiment of the present disclosure, intervals between adjacent two of the anti-reflection strips are the same.

According to an embodiment of the present disclosure, the light-enhancing layer is disposed on a side closing to the display panel, and the light-enhancing layer is not in contact with a sidewall of the through hole.

According to an embodiment of the present disclosure, a distance between the light-enhancing layer and the sidewall of the through hole is between 0.1 millimeter to 1 millimeter.

According to an embodiment of the present disclosure, the anti-reflection layer comprises a first anti-reflection layer and a second anti-reflection layer;

wherein, the first anti-reflection layer is disposed on a side surface of the light-enhancing layer close to the display panel, and the second anti-reflection layer is disposed on a side surface of the light-enhancing layer away from the display panel.

According to an embodiment of the present disclosure, both the first anti-reflection layer and the second anti-reflection layer are patterned, and a patterned structure of the first anti-reflection layer is the same as a patterned structure of the second anti-reflection layer.

According to an embodiment of the present disclosure, a material of the light-enhancing layer includes any one of transparent polyethylene terephthalate, transparent polyacrylate, and transparent polyurethane resin material.

According to an embodiment of the present disclosure, a light transmittance of the light-enhancing layer is greater than 90%.

According to an embodiment of the present disclosure, the anti-reflection layer includes at least one of an anti-reflection film and an anti-reflection coating.

According to an embodiment of the present disclosure, the display module further includes a backplane, the backplane is disposed between the display panel and the supporting layer, and the light-enhancing layer is attached to the backplane.

According to an embodiment of the present disclosure, the supporting layer includes a foam layer and a first adhesive layer, wherein the foam layer is disposed on the first adhesive layer, and the foam layer is disposed on a side of the backplane away from the display panel.

In a third aspect, the embodiments of the present disclosure further provide a display device, the display device includes a display module, the display module includes: a display area and a camera area, the display module has a through hole; and an optical sensor, the optical sensor being disposed in the camera area corresponding to the through hole;

wherein, the display module is the display module provided in the embodiments of the present disclosure. The camera area and the display area of the display module and the display device have a good consistency, thereby effectively improving the display effect and overall performance of the display panel.

Beneficial Effect

The beneficial effects of the embodiments of the present disclosure includes:

The display module provided by the embodiment of the present disclosure includes a display panel and a supporting layer. The supporting layer is provided with a through-hole, and the through-hole is arranged in the camera area of the display module. Wherein, the display module further includes a light-enhancing layer, the light-enhancing layer is arranged in the through hole, and an anti-reflection layer is disposed on at least one light-transmitting surface of the light-enhancing layer. When light inside the camera area passes through the camera area, the light will pass through the anti-reflection layer and the light-enhancing layer in sequence, and finally be emitted to outside of the display module. Under an influence of the light-enhancing layer and the anti-reflection layer, the light will make the display effect in the display area and the camera area tend to be consistent, thereby reducing the chromatic aberration between different areas of the display panel, thereby effectively improving the display effect and overall performance of the display module and the display device.

DETAILED DESCRIPTION OF EMBODIMENTS

Following descriptions of various embodiments refer to accompanying drawings to illustrate specific embodiments in which the present disclosure may be practiced.

With continuous development of manufacturing technology of a display panel, people have put forward higher requirements for performance and quality of display panels.

Figure 1:
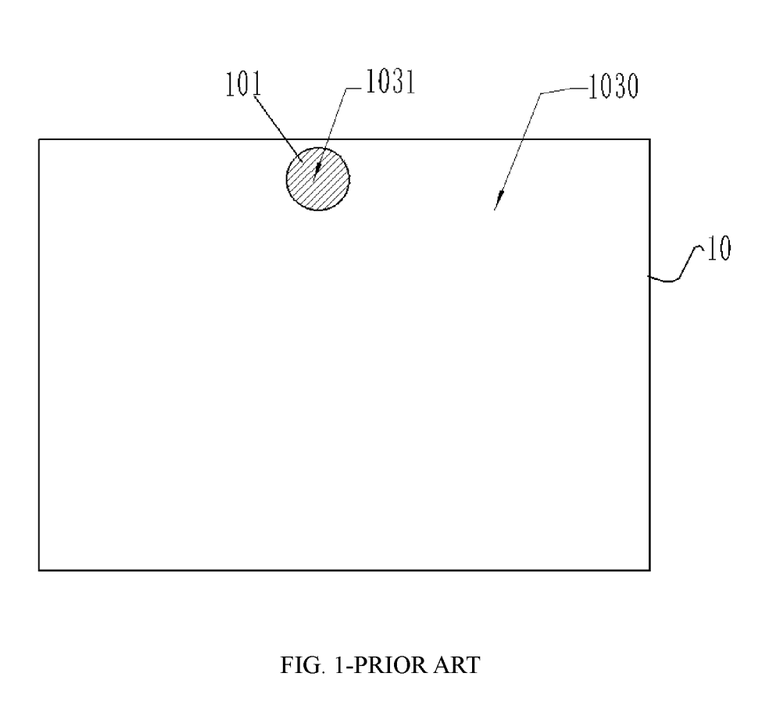
FIG. 1 is a schematic structural plan view of a display panel provided in a prior art.

As shown in FIG. 1, FIG. 1 is a schematic plan view of a display panel provided in a prior art. In the prior art, when manufacturing a display panel, in order to realize a camera function of the display panel and a corresponding full-screen display effect, a camera hole is usually set in the display panel. As shown in FIG. 1, a camera hole 101 is provided in a screen of the display panel 10, the light from outside is captured through the camera hole 101 to realize the camera function of the display panel. However, during manufacturing of the display panel, since the camera hole 101 is provided in a camera area 1031 of the display panel 10, there is a difference between the camera area 1031 corresponding to the camera hole 101 and a display area 1030 corresponding to a non-aperture area. For example, when user observes the display panel from the outside and when the display panel is in an off-screen state, there is a large chromatic aberration between the camera area 1031 and the display area 1030, and the camera area 1031 is clearly visible, which affects the display effect of the display panel 10 and reduces overall performance of the display panel 10.

In order to resolve problems of full-screen display panels such as large chromatic aberration between the camera area and the display area, and the display effect is not ideal, embodiments of the present disclosure provide a display module and a display device, so as to effectively improve display consistency of the display panel and the display effect of the display panel.

Figure 2:
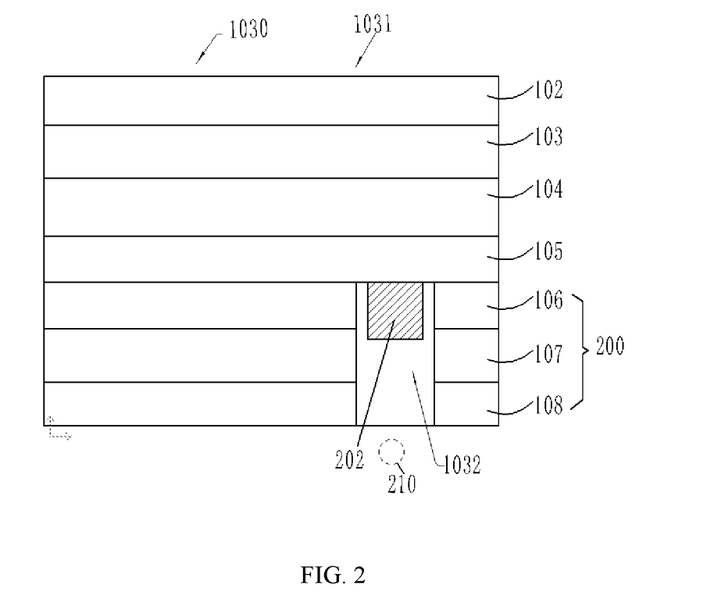
FIG. 2 is a schematic structural diagram of a display module according to an embodiment of the present disclosure.

As shown in FIG. 2, FIG. 2 is a schematic structural diagram of a display module according to an embodiment of the present disclosure. In the display module provided by the embodiment of the present disclosure, the display module includes a display panel 104 and a supporting layer 200 disposed on one side of the display panel. Specifically, the supporting layer 200 is disposed on one side of the display panel 104 away from a light output side of the display panel. In an embodiment of the present disclosure, the supporting layer 200 provided on a back of the display panel is used as an example for description.

Wherein, the display module further includes a backplane 105. Specifically, the backplane 105 is disposed on one side of the display panel 104, for example, the backplane 105 is disposed on a bottom of the display panel, and the backplane 105 is disposed between the supporting layer 200 and the display panel 104, so as to effectively stabilize and support the display panel 104.

Further, in an embodiment of the present disclosure, the supporting layer 200 may be set as a laminated structure including multiple film layers stacked on each other. Specifically, the supporting layer 200 includes a first adhesive layer 106, a foam layer 107, and a metal layer 108.

The first adhesive layer 106 is disposed on one side of the backplane 105 away from the display panel 104, at a same time, the foam layer 107 is disposed on one side of the first adhesive layer 106 away from the display panel 104, and the metal layer 108 is disposed on one side of the foam layer 107 away from the display panel 104. Therefore, in the embodiment of the present disclosure, the first adhesive layer 106, the foam layer 107, and the metal layer 108 are adhered to each other, and constitute the corresponding supporting layer 200.

In an embodiment of the present disclosure, the first adhesive layer 106 mainly plays a role of sticking, and the foam layer 107 is adhered to the display panel through the first adhesive layer 106. The foam layer 107 mainly plays a role of supporting and buffering, wherein the foam layer 107 can be a foam material with certain resilience. When the display module is dropped from a height, the foam layer 107 disposed in the supporting layer 200 can better buffer impact force inside the display module, thereby effectively improving impact resistance and anti-collision performances of the display panel and improving stability of the display module.

Preferably, the metal layer 108 may include metal materials such as metal aluminum, metal copper and so on, which have excellent heat dissipation performance and light weight. Therefore, the supporting layer 200 not only can have a good supporting effect, but also have a good heat dissipation performance, so as to effectively improve a comprehensive performance of the display module.

Further, when setting the structure of each film layer in the display module in the embodiment of the present disclosure, corresponding film thicknesses of the first adhesive layer 106, the foam layer 107, and the metal layer 108 can be determined according to specifications and sizes of actual products. Thickness of the foam layer 107 and the metal layer 108 can be increased to improve its impact resistance and heat dissipation effect when a size of the display device corresponding to the display module is large and a heating phenomenon is serious. Specifically, the thickness of each film layer is not described in detail here.

Preferably, in an embodiment of the present disclosure, the display module further includes a display area 1030 and a camera area 1031, wherein the camera area 1031 can be disposed on at least one side of the display area 1030. In an embodiment of the present disclosure, the camera area 1031 is arranged near a peripheral edge area of a display screen corresponding to the display module, so as to greatly improve an overall visual effect of a full screen.

Correspondingly, a through hole 1032 is further disposed in the supporting layer 200 in the display module. The through hole 1032 is disposed on a position corresponding to the camera area 1031 of the display module. By disposing the through hole 1032, so as to receive external light, at a same time, an optical sensor 210 can also be arranged at a position corresponding to the through hole 1032. In an embodiment of the present disclosure, the optical sensor 210 is disposed outside the through hole 1032, and when the optical sensor 210 moves, the optical sensor 210 can extend into an interior of the through hole 1032. Preferably, the optical sensor 210 may be a camera module or other photosensitive devices.

Further, in an embodiment of the present disclosure, a light-enhancing layer 202 is further disposed in the through hole 1032. Specifically, the light-enhancing layer 202 may be disposed at a position close to one side of the display panel 104. In an embodiment of the present disclosure, the light-enhancing layer 202 is disposed on the side of the backplane 105 away from the display panel 104 and is attached to the backplane 105.

When light enters the area corresponding to the through hole 1032 from the outside, or the light enters the outside from the through hole 1032, the light will pass through the layers above it and the light-enhancing layer 202 in sequence, and finally reach the optical sensor 210 disposed on a bottom of the through hole 1032. In an embodiment of the present disclosure, the light-enhancing layer 202 is arranged to act on the light, so as to reduce probability that the light is easily diffracted in the camera area causing the chromatic aberration between the display area 1030 and the camera area 1031 to be lager, to achieve a purpose of improving the display effect and comprehensive performance of the display module and the display device.

Further, the display module further includes an optical adhesive layer 103 and a cover plate layer 102 disposed on the optical adhesive layer 103.

Figure 3:
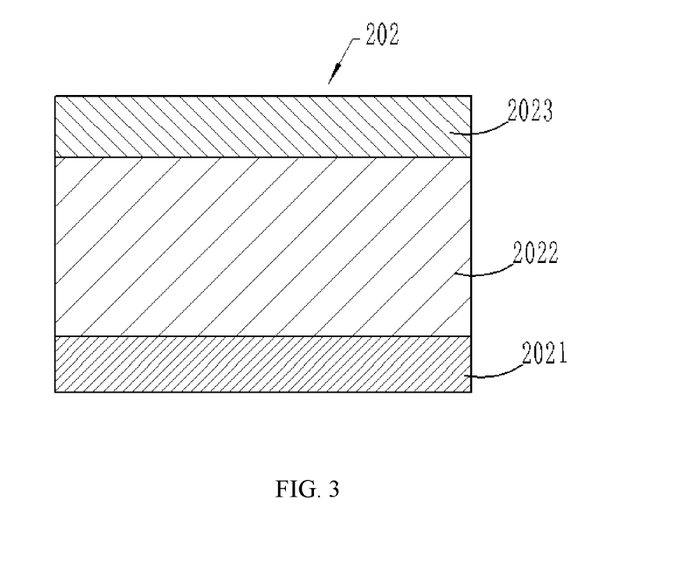
FIG. 3 is a schematic structural diagram of a light-enhancing layer according to an embodiment of the present disclosure.

As shown in FIG. 3, FIG. 3 is a schematic structural diagram of a light-enhancing according to an embodiment of the present disclosure. Specifically, the light-enhancing layer 202 can be a multilayer film structure. Specifically, the light-enhancing layer 202 may include an anti-reflection layer 2021, a body 2022, and a second adhesive layer 2023.

Specifically, the second adhesive layer 2023 is disposed on one side of the backplane 105, and the body 2022 and the backplane 105 are attached and fixed through the second adhesive layer 2023. At a same time, the anti-reflection layer 2021 is attached to another side of the body 2022, and finally the light-enhancing layer 202 provided in the embodiment of the present disclosure is formed.

Wherein, the second adhesive layer 2023 and the body 2022 are both configured as transparent material film layers, so as to reduce attenuation of light therein and to improve light transmittance of the display device. Preferably, a material of the body 2022 may include any one of polyethylene terephthalate, transparent polyacrylate, and transparent polyurethane resin materials. At a same time, a material of the second adhesive layer 2023 can be selected from transparent polyacrylate or other transparent materials with good adhesive properties. The transparent materials mentioned above can further improve transmittance of light to ensure the display effect of the display device.

In order to further improve performance and effect of the body 2022 and the second adhesive layer 2023, in an embodiment of the present disclosure, materials of the body 2022 and the second adhesive layer 2023 are both transparent polyacrylate. For the body 2022, a thickness of the body 2022 is set between 0.025 mm to 0.1 mm, at a same time, light transmittance of the material of the body 2022 is greater than 90%, and reflectivity of the body 2022 is less than 6.5%, so as to ensure the effect of the body 2022 on light. Further, for the second adhesive layer 2023, a thickness of the second adhesive layer 2023 is set between 0.01 mm to 0.05 mm, and at a same time, light transmittance of the second adhesive layer 2023 is greater than 90%, and reflectivity of the second adhesive layer 2023 is less than 7%, thereby ensuring that the second adhesive layer 2023 not only has a good bonding effect, but also has good optical performances.

Figure 4:
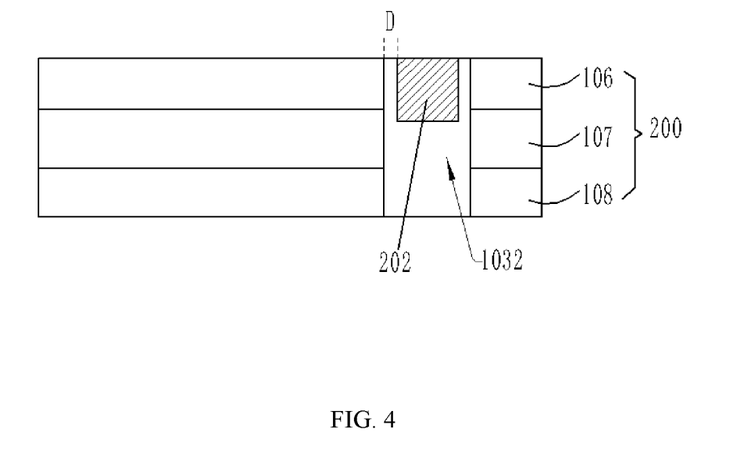
FIG. 4 is a schematic structural diagram of a partial film layer structure corresponding to the display module according to an embodiment of the present disclosure.

Further, as shown in FIG. 4, FIG. 4 is a schematic structural diagram of a partial film layer structure corresponding to a display module according to an embodiment of the present disclosure. In order to ensure the effect of the light-enhancing layer 202 on the light, when the light-enhancing layer 202 is disposed, the light-enhancing layer 202 can be disposed at a central area of the through hole 1032, and the light-enhancing layer 202 is symmetrical with respect to a central axis of the through hole 1032. When light reaches the through hole, the light-enhancing layer 202 can enable the light to have better consistency in different areas, thereby improving the optical performance of the display module.

In an embodiment of the present disclosure, the light-enhancing layer 202 is not in contact with a sidewall of the through hole 1032. At a same time, a distance between a periphery of the light-enhancing layer 202 and the sidewall of the through hole 1032 is D. In an embodiment of the present disclosure, a value of D is 0.1 mm to 1 mm. Therefore, chromatic aberration between the through hole area and the display area is reduced as much as possible.

Further, when disposing the light-enhancing layer 202, a height of the light-enhancing layer 202 is less than a depth of an aperture of the through hole 1032, and it is ensured that the height of the light-enhancing layer 202 is less than half of the depth of the through hole.

Figure 5:
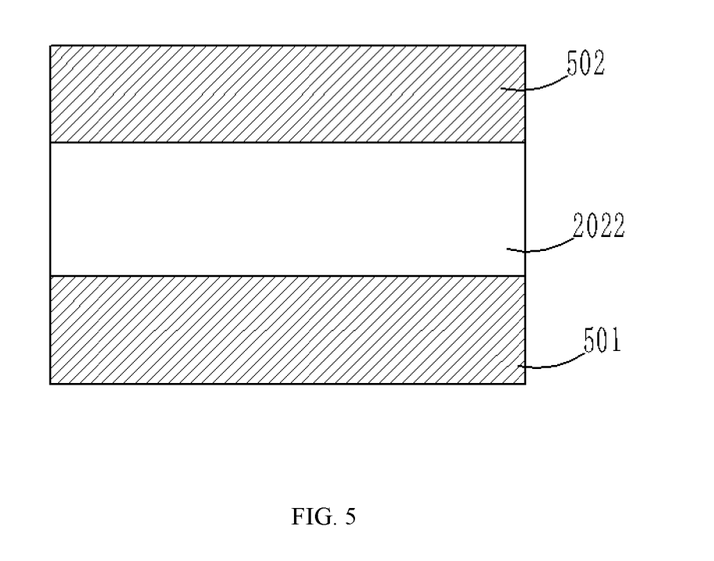
FIG. 5 is a schematic structural diagram of an anti-reflection layer according to an embodiment of the present disclosure.

Further, the anti-reflection layer 2021 may be provided on one side of the body 2022. Further, in an embodiment of the present disclosure, the anti-reflection layer may also be provided on the another side of the body 2022. As shown in FIG. 5, FIG. 5 is a schematic structural diagram of an anti-reflection layer according to an embodiment of the present disclosure. Wherein, the anti-reflection layer includes a first anti-reflection layer 501 and a second anti-reflection layer 502. The first anti-reflection layer 501 and the second anti-reflection layer 502 are disposed on opposite side surfaces of the body 2022 and one side surface of the first anti-reflection layer 501 or one side surface of the second anti-reflection layer 502 are ensured to be adhered to the second adhesive layer, and finally the light-enhancing layer 202 provided in the embodiment of the present disclosure is formed.

Wherein, when disposing, a thickness of the first anti-reflection layer 501 and a thickness of the second anti-reflection layer 502 are same, and a material of the first anti-reflection layer 501 and a material of the second anti-reflection layer 502 are also same, so as to ensure the display modules have better consistency.

In an embodiment of the present disclosure, the anti-reflection layer is disposed on the body 2022 in a patterned manner.

Specifically, when only one anti-reflection layer 2021 is disposed on the body, for example, the anti-reflection layer 2021 is disposed on a side of the body 2022 away from the display panel. At this time, the anti-reflection layer 2021 is disposed on the body 2022 in a patterned manner.

Figure 6:
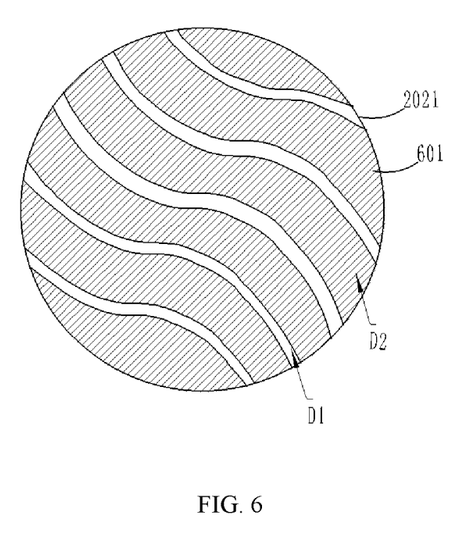
FIG. 6 is a schematic structural diagram of pattern structures of the anti-reflection layer according to an embodiment of the present disclosure.

As shown in FIG. 6, FIG. 6 is a schematic structural diagram of pattern structures of the anti-reflection layer according to an embodiment of the present disclosure and combine other film structures in FIGS. 2 to 5, at this time, an outer contour of the body 2022 is circular, accordingly, an outer contour of the anti-reflection layer is also set to be circular, and an arc radius of the anti-reflection layer is same as an arc radius of the body.

Preferably, the patterned anti-reflection layer 2021 includes a plurality of anti-reflection strips 601. In addition, there is an interval between two adjacent anti-reflection strips 601, and the plurality of anti-reflection strips 601 are arranged at intervals to form the patterned anti-reflection layer 2021 and provided by the embodiment of the present disclosure.

Referring to FIG. 6 for details, at this time, the plurality of anti-reflection strips 601 are all arranged in a same direction and extend from one end of the circular area to another end of the circular area. Wherein each of the anti-reflection strips 601 is arranged to be a serpentine curved structure. In an embodiment of the present disclosure, a width of the anti-reflection strip 601 is D2, and the width D2 of each anti-reflection strip 601 can be set same.

Meanwhile, a distance between two adjacent anti-reflection strips 601 is D1, and distances between each interval in the patterned anti-reflection layer are all D1. Preferably, the distance is set to $0.1$ mm$<$D1$<1$ mm. In an embodiment of the present disclosure, since the anti-reflection layer is arranged in a strip-shaped patterned structure, and an interval is formed between two adjacent anti-reflection strips, when light passes through the above-mentioned interval, diffraction will not be formed, thereby improving the display effect of the camera area. Furthermore, in an embodiment of the present disclosure, anti-reflection strips are arranged to change propagation effect of light in the through-hole area, so as to improve the chromatic aberration between the camera area and the display area in the display panel, and to improve the display effect of the display device.

Preferably, an outer contour of each anti-reflection strip 601 can be set to be same, for example, radians corresponding to the serpentine anti-reflection strips at an arc transition are same, so as to ensure that the anti-reflection layer can have better consistency in different areas.

Further, in an embodiment of the present disclosure, when the above-mentioned distance D1 is set, it can also be set with a certain rule. If the above-mentioned distances D1 are set according to a certain numerical relationship, a value difference between adjacent serpentine structures can be made different. For example, multiple distances D1 form an arithmetic relationship, so as to ensure that it can act on light with different colors, so as to prevent the light from diffracting and causing a problem of unsatisfactory display effect in this area, and to reduce chromatic aberration in different areas at a same time.

Figure 7:
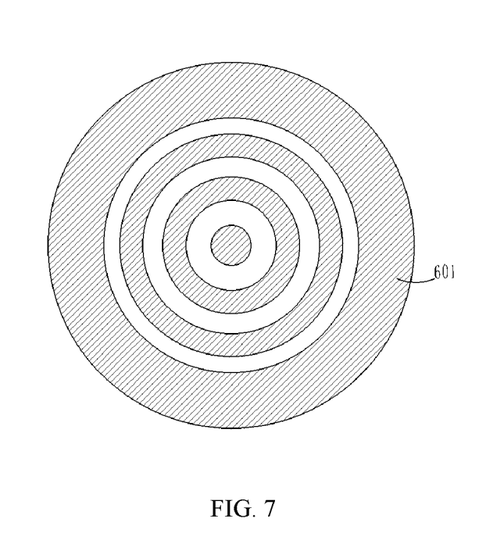
FIG. 7 is a schematic structural diagram of another anti-reflection layer according to an embodiment of the present disclosure.

Further, as shown in FIG. 7, FIG. 7 is a schematic structural diagram of another anti-reflection layer according to an embodiment of the present disclosure. In combination with the patterned structure in FIG. 6, in an embodiment of the present disclosure, the pattern structure of the anti-reflection layer can also be set as circular, and a plurality of the anti-reflection strips 601 with circular shapes are arranged in a concentric circle, and centers of the concentric circles can coincide with a center of the light-enhancing layer. At a same time, in an embodiment of the present disclosure, in order to ensure the effect of the anti-reflection layer on the light, the distance D1 between the anti-reflection strips 601 can be same when setting.

Further, because a perimeter corresponding to the anti-reflection layer arranged at an edge area of the anti-reflection layer is larger than a perimeter corresponding to the anti-reflection layer arranged at the central area, and there is an interval between the edge area of the anti-reflection layer and the sidewall of the through hole, therefore, in an embodiment of the present disclosure, when setting the anti-reflection strips 601 arranged at the edge area of the anti-reflection layer, the width of the anti-reflection strips 601 at the edge area can be larger than the width of the anti-reflection strips 601 at the central area, thereby effectively acting on the light at the edge area, avoiding the light diffracting in the edge area, thereby reducing brightness of the camera area, and improving the consistency of the display effect.

Preferably, a number of the anti-reflection strips 601 with a shape of concentric circle and a size of the distance D1 and a size of the distance D2 can be set according to the radius and the size of the light-enhancing layer, which are not specifically limited here.

Figure 8:
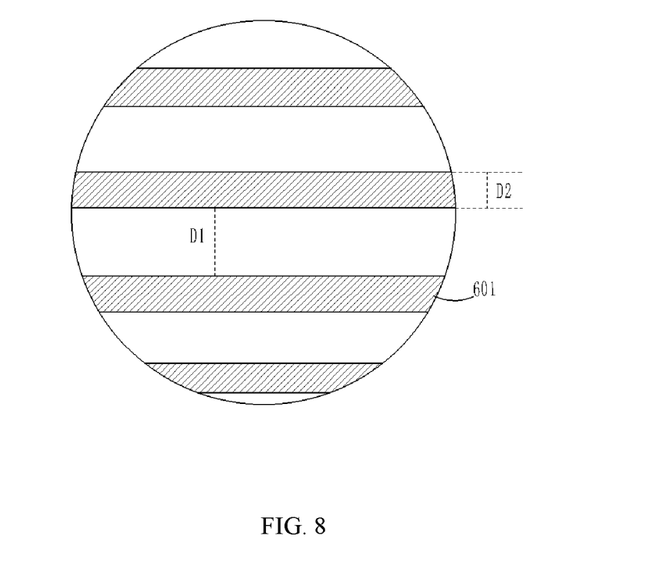
FIG. 8 is a schematic structural diagram of pattern structures of yet another anti-reflection layer according to an embodiment of the present disclosure.

Please refer to FIG. 8 for details. FIG. 8 is a schematic structural diagram of another pattern structures of the anti-reflection layer according to an embodiment of the present disclosure. In combination with the patterned structures in FIGS. 6 to 7, in an embodiment of the present disclosure, the anti-reflection strips 601 in the anti-reflection layer can also be disposed as strip-shaped structures. An interval of the distance D1 between the anti-reflection strips 601 disposed at the central area is greater than an interval of the distance D1 between the anti-reflection strips 601 disposed at the edge area. Meanwhile, in an embodiment of the present disclosure, a width value of each anti-reflection strip 601 may be set to a same width value.

In an embodiment of the present disclosure, by setting the patterned structure of the anti-reflection layer into strips, when the light passes through the interval between the strips, the diffraction phenomenon of the light in the camera area will be prevented, thereby improving the display effect of the camera area, and reducing the chromatic aberration between the two areas to improve the consistency of the display effect between different areas.

Figure 9:
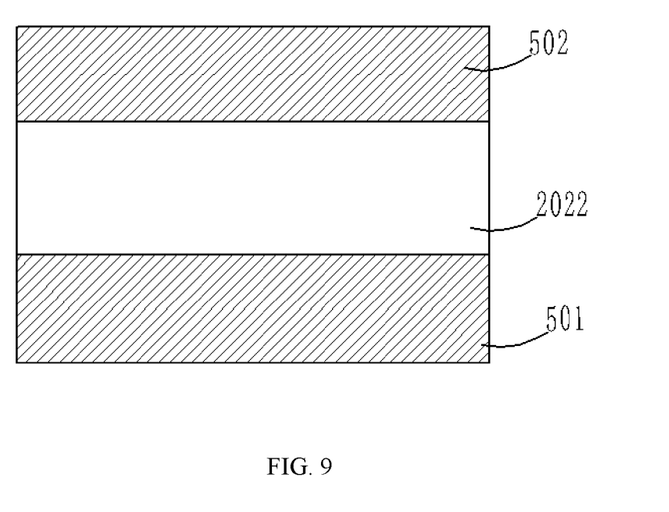
FIG. 9 is a schematic structural diagram of two anti-reflection layers according to an embodiment of the present disclosure.

Further, as shown in FIG. 9, FIG. 9 is a schematic structural diagram of two anti-reflection layers according to an embodiment of the present disclosure. In combination with the structure in FIG. 5, in an embodiment of the present disclosure, two anti-reflection layers are disposed on the light-enhancing layer of the display module: a first anti-reflection layer 501 and a second anti-reflection layer 502.

The first anti-reflection layer 501 and the second anti-reflection layer 502 are both arranged in patterned structures. Moreover, when the first anti-reflection layer 501 and the second anti-reflection layer 502 are patterned, the patterned structures of the first anti-reflection layer 501 and the second anti-reflection layer 502 are same. For example, the first anti-reflection layer 501 and the second anti-reflection layer 502 are set as the patterned structures shown in FIGS. 5-7.

Further, after the patterning is completed, the anti-reflection strips of the first anti-reflection layer 501 and the anti-reflection strips of the second anti-reflection layer 502 are in one-to-one correspondence, and intervals between adjacent anti-reflection strips of the first anti-reflection layer 501 are in one-to-one correspondence with intervals between adjacent anti-reflection strips of the second anti-reflection strip 502. This enables light to enter or exit from a corresponding area to ensure the display panel to display normally. At a same time, since the light in this area will be affected by the anti-reflection layers above and below in turn, the display effect in this area can be further improved, thereby improving the consistency of the display effect between the display area and the camera area.

Further, in an embodiment of the present disclosure, a material of the anti-reflection layer may include at least one of an anti-reflection film and an anti-reflection coating. When the anti-reflection layer is the anti-reflection film, the anti-reflection film can be directly attached to the body of the light-enhancing layer; when the material of the anti-reflection layer is a coating material, the coating material can be coated on a side of a corresponding body and be dried and stabilized, and then the light-enhancing layer is disposed on one side of the backplane.

Further, an embodiment of the present disclosure also provides a display device. The display device includes a display module and a camera module, and the camera module is correspondingly disposed at a camera area of the display module. Wherein, the display module is the display module provided in the embodiment of the present disclosure. A through hole is disposed in film layers corresponding to the display module, and a light-enhancing layer is also arranged in the through hole, and an anti-reflection layer is arranged on at least one side of the light-enhancing layer. The light-enhancing layer and the anti-reflection layer are used to reduce diffraction of light, improve display effect of the camera area, ensure that the display area and the camera area have better consistency, and finally improve display effect and overall performance of the display device.

In an embodiment of the present disclosure, the display module and the display device can be applied to any product or component with a display and photographing function, such as a mobile phone, a computer, a notebook computer, and a digital photo frame, and so on, and the specific types thereof are not specifically limited.

In summary, the display module and the display device provided by the embodiments of the present disclosure have been introduced in detail above. Specific examples are used in the present disclosure to illustrate principles and implementations of the present disclosure. Descriptions of the above embodiments are only used to help to understand the technical solution and core idea of the present disclosure; although the present disclosure is disclosed as above with preferred embodiments, the above-mentioned preferred embodiments are not intended to limit the present disclosure. Those of ordinary skill in the art do not depart from the spirit of the present disclosure. Various changes and modifications can be made within a scope of the present disclosure, so a protection scope of the present disclosure is based on a scope defined by the claims.

What is claimed is:

1. A display module, comprising a display area and a camera area disposed on at least one side of the display area; the display module further comprising:
   a display panel; and
   a supporting layer, the supporting layer being disposed on
      a side of the display panel away from a light output side of the display panel, the supporting layer having a through hole, and the through hole being correspondingly disposed in the camera area;

wherein, the display module further comprises a light-enhancing layer, the light-enhancing layer is disposed in the through hole, an anti-reflection layer is disposed on at least one light-transmitting surface of the light-enhancing layer, and the light-enhancing layer is symmetrical with respect to a central axis of the through hole;

wherein the light-enhancing layer is disposed in the through hole and on a side close to the display panel, and the light-enhancing layer is not in contact with a sidewall of the through hole.

2. The display module in claim 1, wherein a material of the light-enhancing layer comprises any one of transparent polyethylene terephthalate, transparent polyacrylate, and transparent polyurethane resin material.

3. The display module in claim 2, wherein a light transmittance of the material of the light-enhancing layer is greater than 90%.

4. A display module, comprising a display area and a camera area disposed on at least one side of the display area; the display module further comprising:

a display panel; and, a supporting layer, the supporting layer being disposed on a side of the display panel away from a light output side of the display panel, the supporting layer having a through hole, and the through hole being correspondingly disposed in the camera area;

wherein, the display module further comprises a light-enhancing layer, the light-enhancing layer is disposed in the through hole, and an anti-reflection layer is disposed on at least one light-transmitting surface of the light-enhancing layer;

wherein the light-enhancing layer is disposed in the through hole and on a side close to the display panel, and the light-enhancing layer is not in contact with a sidewall of the through hole.

5. The display module in claim 4, wherein the anti-reflection layer is patterned and disposed on the light-enhancing layer.

6. The display module in claim 5, wherein the anti-reflection layer comprises a plurality of anti-reflection strips arranged at intervals.

7. The display module in claim 6, wherein the plurality of the anti-reflection strips are arranged in serpentine patterns along a same direction.

8. The display module in claim 7, wherein an interval between adjacent two of the anti-reflection strips in the serpentine patterns is greater than 0.1 mm and less than 1 mm.

9. The display module in claim 8, wherein intervals between adjacent serpentine patterns are different.

10. The display module in claim 6, wherein the plurality of the anti-reflection strips are arranged in a concentric circle structure on the light-enhancing layer.

11. The display module in claim 10, wherein a width of one of the anti-reflection strips arranged at an edge area of the concentric circle structure is greater than a width of any one of the anti-reflection strips arranged at a central area of the concentric circle structure.

12. The display module in claim 10, wherein intervals between adjacent two of the anti-reflection strips are same.

13. The display module in claim 4, wherein a distance between the light-enhancing layer and the sidewall of the through hole is between 0.1 mm to 1 mm.

14. The display module in claim 4, wherein the anti-reflection layer comprises a first anti-reflection layer and a second anti-reflection layer;

wherein, the first anti-reflection layer is disposed on a side surface of the light-enhancing layer close to the display panel, and the second anti-reflection layer is disposed on a side surface of the light-enhancing layer away from the display panel.

15. The display module in claim 14, wherein both the first anti-reflection layer and the second anti-reflection layer are patterned, and a patterned structure of the first anti-reflection layer is same as a patterned structure of the second anti-reflection layer.

16. The display module in claim 4, wherein the anti-reflection layer comprises at least one of an anti-reflection film and an anti-reflection coating.

17. The display module in claim 4, wherein the display module further comprises a backplane, the backplane is disposed between the display panel and the supporting layer, and the light-enhancing layer is attached to the backplane.

18. The display module in claim 17, wherein the supporting layer comprises a foam layer and a first adhesive layer, wherein the foam layer is disposed on the first adhesive layer, and the foam layer is disposed on a side surface of the backplane away from the display panel.

19. A display device, comprising:

a display module, the display module comprising a display area and a camera area, the display module having a through hole; and an optical sensor, the optical sensor being disposed in the camera area corresponding to the through hole;

wherein, the display module further comprises:

a display panel; and, a supporting layer, the supporting layer is disposed on one side of the display panel away from a light output side of the display panel, and the through hole is correspondingly disposed in the camera area;

wherein, the display module further comprises a light-enhancing layer, the light-enhancing layer is disposed in the through hole, and an anti-reflection layer is disposed on at least one light-transmitting surface of the light-enhancing layer;

wherein the light-enhancing layer is disposed in the through hole and on a side close to the display panel, and the light-enhancing layer is not in contact with a sidewall of the through hole.

20. The display device according to claim 19, wherein the anti-reflection layer is patterned and disposed on the light-enhancing layer, and the anti-reflection layer comprises a plurality of anti-reflection strips arranged at intervals.

* * * * *